(12) United States Patent
Korthäuer et al.

(10) Patent No.: US 10,676,229 B2
(45) Date of Patent: Jun. 9, 2020

(54) STAMP BASE FOR A LABEL STAMP, AND LABELLING APPARATUS AND METHOD

(71) Applicant: ESPERA-WERKE GmbH, Duisburg (DE)

(72) Inventors: Marcus Korthäuer, Mülheim an der Ruhr (DE); Winfried Vicktorius, Duisburg (DE); Peter Wolff, Swisttal-Heimerzheim (DE); Ralf Dippe, Duisburg (DE)

(73) Assignee: Espera-Werke GmbH, Duisburg (DE)

( * ) Notice: Subject to any disclaimer, the term of this patent is extended or adjusted under 35 U.S.C. 154(b) by 0 days.

(21) Appl. No.: 15/770,421

(22) PCT Filed: Jul. 20, 2016

(86) PCT No.: PCT/EP2016/067282
§ 371 (c)(1),
(2) Date: Apr. 23, 2018

(87) PCT Pub. No.: WO2017/076523
PCT Pub. Date: May 11, 2017

(65) Prior Publication Data
US 2018/0334279 A1 Nov. 22, 2018

(30) Foreign Application Priority Data
Nov. 6, 2015 (DE) .......................... 10 2015 119 139

(51) Int. Cl.
*B65C 9/00* (2006.01)
*B65C 1/00* (2006.01)
(Continued)

(52) U.S. Cl.
CPC ................ *B65C 9/28* (2013.01); *B65C 1/021* (2013.01); *B65C 9/1884* (2013.01); *B65C 9/36* (2013.01);
(Continued)

(58) Field of Classification Search
CPC .......................... Y10T 156/1744; B65C 1/021
See application file for complete search history.

(56) References Cited

U.S. PATENT DOCUMENTS

| 5,232,540 | A | 8/1993 | Southwell et al. |
| 5,750,004 | A | 5/1998 | Wurz et al. |

FOREIGN PATENT DOCUMENTS

| EP | 1640276 A1 | 3/2006 |
| EP | 2298510 A1 | 3/2011 |

(Continued)

*Primary Examiner* — Linda L Gray
(74) *Attorney, Agent, or Firm* — Rankin, Hill & Clark LLP

(57) ABSTRACT

The present invention relates to a punch foot (1) for a label punch (2) of a device (3) for labeling individual packs (4), having a punch foot housing (5) which in an extent direction (E) extends from a first housing end (5a) having a first housing opening (6a) to a second housing end (5b) having a second housing opening (6b); having a pressure duct (7) which in the punch foot housing (5) extends from the first housing opening (6a) in the extent direction (E); having a perforated plate (8) which closes the second housing opening (6b) and is connected to the punch foot housing (5), by way of which at least one primary nozzle (9) extends in an orientation direction (V); having a pressure chamber (10) which in the punch foot housing (5) extends from the perforated plate (8) counter to the extent direction (E) and which in a manner orthogonal to the extent direction (E) is on all sides delimited by a punch foot housing wall portion (11); having a connection portion (12) which in the punch foot housing (5) in the extent direction (E) extends between the pressure duct (7) and the pressure chamber (10) and which connects the pressure duct (7) to the pressure chamber (10); and having a control element (13) which is disposed in the pressure chamber (10) and which is movable between two terminal positions (I, II) that effect dissimilar flows (Continued)

through the pressure chamber (10); whereby the at least one primary nozzle (9) connects the pressure chamber (10) to the environment of the punch foot housing (5). In order for the handling to be simplified, the invention proposes that at least one secondary nozzle (14) which connects the pressure chamber (10) to the environment of the punch foot housing (5) extends through the punch foot housing wall portion (11) that delimits the pressure chamber (10) on all sides in a manner orthogonal to the extent direction (E). The invention furthermore relates to a device (3) and to a method for labeling individual packs (4).

27 Claims, 3 Drawing Sheets

(51) Int. Cl.
*B32B 37/00* (2006.01)
*B65C 9/28* (2006.01)
*B65C 9/36* (2006.01)
*B65C 1/02* (2006.01)
*B65C 9/18* (2006.01)
*B65C 9/42* (2006.01)
*B32B 37/10* (2006.01)

(52) U.S. Cl.
CPC .............. *B65C 9/42* (2013.01); *B32B 37/025* (2013.01); *B32B 37/10* (2013.01); *Y10T 156/1707* (2015.01); *Y10T 156/1744* (2015.01)

(56) References Cited

FOREIGN PATENT DOCUMENTS

| | | |
|---|---|---|
| GB | 2078668 A | 1/1982 |
| JP | 2012012069 A | 1/2012 |

STAMP BASE FOR A LABEL STAMP, AND LABELLING APPARATUS AND METHOD

The present invention relates to a punch foot for a label punch of a device for labeling individual packs, having a punch foot housing which in an extent direction extends from a first housing end having a first housing opening to a second housing end having a second housing opening; having a pressure duct which in the punch foot housing extends from the first housing opening in the extent direction; having a perforated plate which closes the second housing opening and is connected to the punch foot housing, by way of which at least one primary nozzle extends in an orientation direction; having a pressure chamber which in the punch foot housing extends from the perforated plate counter to the extent direction and which in a manner orthogonal to the extent direction is on all sides delimited by a punch foot housing wall portion; having a connection portion which in the punch foot housing in the extent direction extends between the pressure duct and the pressure chamber and which connects the pressure duct to the pressure chamber; and having a control element which is disposed in the pressure chamber and which is movable between two terminal positions that effect dissimilar flows through the pressure chamber; whereby the at least one primary nozzle connects the pressure chamber to the environment of the punch foot housing.

The invention furthermore relates to a device for labeling individual packs, having an advancing installation for transporting a respective pack along a transportation path; having a label dispensing installation for providing a label; and having a label application installation having a label punch which has a punch shaft and a punch foot connected thereto; whereby the label punch is movable between a dispensing position in which a dispensed label is able to be suctioned by the punch foot, and an application position in which the suctioned label is able to be blown down onto the respective pack.

The invention finally relates to a method for labeling individual packs while using a punch foot as defined above, and/or while using a device as defined above.

A respective punch foot, a respective device, and a respective method are known, for example, from JP 2012-012069 A. The known punch foot in the interior thereof has a pressure chamber which at the upper side opens into a pressure duct, and at the lower side is delimited by a perforated plate having a multiplicity of nozzles, said perforated plate being connected to the punch foot housing. In order for a label to be suctioned, the pressure chamber can be impinged with negative pressure by way of the pressure duct, on account of which the label is suctioned on the housing lower side, or on the perforated plate, respectively. The pressure chamber can also be impinged with positive pressure, on account of which the label is then blown down and is in particular transferred to a pack to be labelled. The punch foot is thus configured as a combined suction and blower head.

A control element which is rotatable between two terminal positions that effect dissimilar flows through the pressure chamber is disposed in the interior of the pressure chamber of the combined suction and blower head. The nozzles in the perforated plate are covered on the internal side in a dissimilar manner, in particular in terms of dissimilar numbers, in the dissimilar terminal positions, on account of which the effective cross section of the entirety of nozzles in the perforated plate can be adapted to different label sizes.

In the prior art it is problematic that the position of the control element within the pressure chamber has always to be initially set to a specific label size before the punch foot is operationally ready. If labels of another size are to be occasionally suctioned and blown down by the punch foot it is necessary for the control element within the pressure chamber to again be adjusted in advance. The handling of the punch foot and of a respective labeling device which has a label punch having such a punch foot is therefore relatively complicated.

It is therefore an object of the present invention to specify a punch foot for a label punch and a device and a method for labeling individual packs by way of which simpler handling is guaranteed.

The object derived and visualized above in the case of a punch foot for a label punch of a device for labeling individual packs, having a punch foot housing which in an (axial) extent direction extends from a first housing end having a first housing opening to a second housing end having a second housing opening;

having a pressure duct which in the punch foot housing extends from the first housing opening in the extent direction;

having a perforated plate which closes the second housing opening and is connected to the punch foot housing, by way of which at least one primary nozzle extends in an orientation direction;

having a pressure chamber which in the punch foot housing extends from the perforated plate counter to the extent direction and which in a manner orthogonal to the extent direction, i.e. in a radial direction, is on all sides delimited by a punch foot housing wall portion;

having a connection portion which in the punch foot housing in the extent direction extends between the pressure duct and the pressure chamber and which connects the pressure duct to the pressure chamber; and having a control element which is disposed in the pressure chamber and which is movable, in particular completely axially displaceable, between two terminal positions, that is to say between a first and second terminal position, that effect dissimilar flows through the pressure chamber;

whereby the at least one primary nozzle (fluidically, in particular pneumatically) connects the pressure chamber to the environment (external side) of the punch foot housing, according to a first teaching of the present invention is achieved in that at least one secondary nozzle which (fluidically, in particular pneumatically) connects the pressure chamber to the environment (external side) of the punch foot housing extends through the punch foot housing wall portion that delimits the pressure chamber on all sides in a manner orthogonal to the extent direction.

The punch foot according to the invention is a combined suction and blower head which on the lower side thereof thus can alternatively suction a label as well as blow down a previously suctioned label. Such a punch foot is in particular part of a label punch of a device for labeling individual packs such as will be described in yet more detail hereunder.

The punch foot according to the invention has the advantage that labels of different sizes can be manipulated, that is to say suctioned and blown down, by the punch foot without the punch foot to this end having to be manually adjusted prior to the changeover to another label size. In particular, the control element does not have to be separately (actively)

adjusted every time when a changeover is to be made to another label size. The construction according to invention, and in particular the presence of at least one secondary nozzle in a side wall of the punch foot housing, thus permits that a label which is larger than the cross-section of the punch foot at the lower end thereof, in particular in the region of the perforated plate, when being blown down is impacted by the compressed air exiting the punch foot across the entire surface of said label. By contrast, in the case of a smaller label, for example, the surface thereof is impacted only by compressed air which exits the primary nozzle.

A further advantage of the punch foot according to the invention is that when suctioning, thus when the pressure chamber is impinged with negative pressure by way of the pressure duct, the control element closes the at least one secondary nozzle, on account of which the suction pressure for suctioning and holding the label has to be built up exclusively by way of the primary nozzles. On account thereof, only a comparatively minor negative pressure has to be built up for suctioning, the absolute value of said negative pressure in particular being lower than that of the positive pressure for blowing down. As soon as the pressure chamber is again impinged with positive pressure by way of the pressure duct, the control element is automatically displaced axially in the extent direction and on account thereof automatically releases the at least one secondary nozzle again such that the air in the compressed-air pulse that is then performed can exit both from primary nozzles as well as secondary nozzles.

Various design embodiments of the punch foot according to the invention will now be described hereunder, said design embodiments also being the subject matter of the dependent claims.

According to one design embodiment, a plurality of primary nozzles and/or a plurality of secondary nozzles are thus provided.

The at least one nozzle, or a plurality of the nozzles, are in each case configured in particular as a tubular duct, preferably a bore, or as a tube that projects toward the external side of the punch foot housing (the tubular duct in this instance being extended toward the outside). Additionally or alternatively, it is also conceivable in the case of only one primary nozzle and/or secondary nozzle being provided, that said primary nozzle and/or secondary nozzle is in each case configured so as to be slot-shaped. A plurality of slot-shaped primary nozzles and/or secondary nozzles can also be provided and in particular be combined with tubular primary nozzles and/or secondary nozzles.

It is provided in particular that the cross section of the at least one primary nozzle is widened in the orientation direction, or the extent direction, respectively, wherein the cross-sectional widening is preferably provided only in an end portion on the (lower) nozzle end that points outward (so as to be adjacent to the latter), in order to achieve an increase in the suction pressure at the lower nozzle end in the case of negative pressure in the pressure chamber, on account of which an improved adhesion of a label is guaranteed. Alternatively, the nozzle cross section of the at least one primary nozzle can however also be constant or taper toward the outside. The nozzle cross section of the at least one secondary nozzle is also in particular constant, but can also taper or widen toward the outside.

According to one more design embodiment it is provided that the at least one primary nozzle in the extent direction is spaced apart from the at least one secondary nozzle. Spaced apart means that a radial projection (projection in a direction that is orthogonal to the extent direction) of the at least one primary nozzle and of the at least one secondary nozzle do not intersect. However, it is also conceivable that the radial projections intersect, wherein however the respective centers of the (internal) nozzle openings that point toward the pressure chamber lie in a mutually spaced apart planes which run so as to be orthogonal to the extent direction.

According to one more design embodiment it is provided that the at least one secondary nozzle at least in portions, preferably entirely, runs so as to be angled to the extent direction and in particular angled to the orientation direction of the at least one primary nozzle. In particular, the at least one primary nozzle runs parallel to the extent direction, or at an angle of less than 10°, preferably less than 5°, particularly preferably less than 2°, to the extent direction. Additionally or alternatively, the at least one secondary nozzle runs at an angle of more than 20°, preferably more than 30°, particularly preferably more than 40°, to the extent direction.

According to yet one further design embodiment it is provided that the external opening of each secondary nozzle is closer to the second housing end of the punch foot housing than the opening on the internal side of the respective secondary nozzle. The external opening is meant to be the opening of the nozzle at the end thereof that faces away from the pressure chamber. Accordingly, the internal opening is meant to be the opening of said nozzle at the end thereof that faces the pressure chamber.

The duct that in each case extends between the external and the internal opening herein is in particular straight, and/or in particular has a uniform cross-section. In this way, the secondary nozzles in the housing wall, or the respective punch foot housing wall portion, respectively, can be produced in a particularly simple manner. In the case of a plurality of secondary nozzles being provided, it is preferable for said secondary nozzles to be distributed at uniform spacings across the circumference of the punch foot housing and in particular for all said secondary nozzles to have the same spacing from and the same alignment to the primary nozzles in the perforated plate.

According to yet one further design embodiment it is provided that the control element in the extent direction subdivides the pressure chamber into a first (upper or punch-shaft-side) pressure chamber portion and a second (lower or perforated-plate-side) pressure chamber portion, whereby the first pressure chamber portion lies between the control element and the connection portion, and the second pressure chamber portion lies between the control element and the perforated plate. It is in particular conceivable herein that the first pressure chamber portion is (fluidically or pneumatically, respectively) connected to the second pressure chamber portion by way of at least one first connection opening in the control element, or by way of at least one first connection opening between the control element and the punch foot housing wall portion that delimits the pressure chamber on all sides in a manner orthogonal to the extent direction. Additionally or alternatively, it is provided in particular that the first pressure chamber portion is (fluidically or pneumatically, respectively) connected to the connection portion by way of at least one second connection opening in the control element, or by way of at least one second connection opening between the control element and a further punch foot housing wall portion that delimits the connection portion on all sides in a manner orthogonal to the extent direction.

According to one further design embodiment, the first pressure chamber portion is (fluidically or pneumatically, respectively) connected to the environment (external side) of the punch foot housing by way of the at least one secondary nozzle.

As has already been indicated, it is provided according to yet one further design embodiment that the control element and the pressure chamber are configured in such a manner that the control element in the first terminal position thereof completely closes the at least one secondary nozzle and/or in the second terminal position thereof completely releases the at least one secondary nozzle. The control element in the first terminal position is in this instance disposed in the pressure chamber such that exclusively the at least one primary nozzle, or the primary nozzles, respectively, is/are active, whereas the at least one secondary nozzle, or the secondary nozzles, respectively, in this instance is/are forcibly inactive. In this state, a suction flow can be directed through the primary nozzles into the punch foot housing, a label being able to be suctioned by said suction flow on the lower side in the region of the perforated plate. If the control element, by way of generating positive pressure in the punch foot housing and in particular in the pressure chamber, is displaced to the second terminal position in the pressure chamber, the at least one secondary nozzle, or the secondary nozzles, respectively, is/are activated on account thereof such that a pressure flow exits the secondary nozzle or nozzles as well as the primary nozzle or nozzles, the label being blown down on account thereof.

According to again one further design embodiment it is provided that the control element has a plate-shaped portion which in the pressure chamber in a manner orthogonal to the extent direction extends in particular between the first pressure chamber portion and the second pressure chamber portion. A plate-shaped portion is meant to be a portion of which the upper side and the lower side run so as to be mutually parallel, and the thickness (axial extent) of said portion is smaller than the longitudinal extent and/or the transverse extent (radial extent) thereof. It is in particular conceivable herein that the at least one connection opening is disposed in the plate-shaped portion, or between the plate-shaped portion and the punch foot housing wall portion that delimits the pressure chamber on all sides in a manner orthogonal to the extent direction.

It is preferably provided herein that the pressure chamber (at that end of the pressure chamber which is adjacent to the connection portion) has a wall portion, orthogonal to the extent direction, having a wall face that points toward the perforated plate, in particular having an encircling protrusion which points toward the pressure chamber and is preferably formed by an annular seal, whereby the control element in the first terminal position bears on the protrusion, whereby the at least one first connection opening is completely released. The protrusion, or annular seal, respectively, protrudes from the wall face that points to the perforated plate so far that in the first position of the control element a gap (flat space) remains between the upper side of the plate-shaped portion of the control element and the wall face that points toward the perforated plate. The at least one first connection opening in this instance opens into this gap, or flat space, respectively, at the upper side, said gap, or flat space, respectively, in turn being (fluidically or pneumatically, respectively) connected at all times to the at least one second connection opening and by way of the latter at all times to the pressure duct. It is guaranteed in this way that, when suctioning, when the control element is in the first position, there is always a fluidic connection from the at least one primary nozzle by way of the at least one first connection opening, then further by way of the at least one second connection opening, into the pressure duct.

According to yet one further design embodiment it is provided that the control element has a collar-shaped portion which is connected to the plate-shaped portion and in particular from the plate-shaped portion extends in the extent direction toward the perforated plate. The collar-shaped portion extends in particular in a manner orthogonal to the plate-shaped portion. The collar-shaped portion serves in particular for securely (in particular in an airtight manner) closing the at least one secondary nozzle when the control element is in the first position. The latter can at least partially also be performed by the plate-shaped portion. In particular for this purpose it is thus conceivable that the plate-shaped portion and/or the collar-shaped portion on the internal side bear/bears on the punch foot housing wall portion that delimits the pressure chamber on all sides in a manner orthogonal to the extent direction, and in particular in the first terminal position close/closes the at least one secondary nozzle.

According to one more design embodiment it is provided that the control element has a shaft-shaped hollow portion which is connected to the plate-shaped portion and in particular from the plate-shaped portion extends counter to the extent direction toward the pressure duct. The shaft-shaped portion is in particular disposed on the upper side of the plate-shaped portion that faces away from the lower side having the collar-shaped portion. It is conceivable herein that the shaft-shaped portion has a shaft wall which is orthogonal to the plate-shaped portion and which at the end thereof at the pressure duct side delimits (forms) an opening that is coaxial with the pressure duct, whereby the at least one connection opening is disposed in the shaft wall. The central axis of the coaxial opening herein is in particular identical to the central axis of the pressure duct and/or the connection portion. The central axis of the at least one second connection opening in this instance preferably runs so as to be orthogonal to the central axis of the coaxial opening and the extent direction.

According to one more design embodiment it is provided that the shaft-shaped portion bears on the internal side of the connection portion and therein is movably guided, in particular so as to be axially movable, preferably exclusively axially movable, whereby the at least one second connection opening is completely released in particular in the first terminal position and/or the second terminal position of the control element. The at least one second connection opening is thus not covered in the first terminal position of the control element but guarantees that a suction flow can be guided from the primary nozzle or the primary nozzles by way of the at least one first connection opening into the pressure duct, or in an analogous manner in the opposite direction.

According to one further design embodiment it is provided that the total cross-sectional area, that is to say, the sum of all individual cross-sectional areas, of all primary nozzles
    is at least equal to or greater than the total cross-sectional area of all secondary nozzles, and/or
    is at most equal to or smaller than the total cross-sectional area of all first connection openings and/or second connection openings.

Additionally or alternatively, the total cross-sectional area of all second connection openings
    is at most equal to or smaller than the total cross-sectional area of all first connection openings, and/or at most equal to or smaller than the cross-sectional area of the coaxial opening of the shaft-shaped portion that faces the pressure duct.

According to yet one further design embodiment it is provided that the connection portion at the end thereof that faces the perforated plate has a portion having a cross-sectional widening, whereby the at least one second connection opening in the first terminal position of the control element opens into the portion having the cross-sectional widening. The center of the at least one second connection opening, and in particular the entire at least one second connection opening, herein lies within the space which is radially delimited by the portion having the cross-sectional widening. The portion having the cross-sectional widening, when switching over from negative pressure to positive pressure, when the control element is still in the first terminal position, then acts in such a manner that the pressure flow that makes its way from the pressure duct into the shaft-shaped portion exits radially by way of the at least one second connection opening and on the portion having the cross-sectional widening is deflected in the axial direction such that the main proportion of the pressure flow first impacts a part-portion of the plate-shaped portion of the control element, said part-portion being free of first connection openings. On account thereof, the control element is particularly rapidly repositioned from the first terminal position to the second terminal position, this facilitating the generation of an abrupt compressed-air pulse for blowing down a label.

The portion having the cross-sectional widening is in particular configured so as to widen continuously and so as to be preferably funnel-shaped, meaning that the internal face of the portion having the cross-sectional widening widens only gradually in the extent direction and not abruptly as is the case of a rectangular widening. In particular, the internal face of the portion having the cross-sectional widening runs at an angle in a range from 30 to 60°, preferably in a range from 35 to 55°, particularly preferably in a range from 40 to 50°, to the extent direction and, for example, runs at an angle of 45° to the extent direction. The portion having the cross-sectional widening herein terminates at an edge which can also be a rounded edge which forms the transition between the portion having the cross-sectional widening and the upper wall portion which can have the encircling protrusion or annular seal.

According to yet one further design embodiment it is provided that the punch foot housing is constructed in two parts, whereby a first housing part comprises the pressure duct, and a second housing part comprises the connection portion, the pressure chamber, and the perforated plate, whereby in particular the first housing part is connected, preferably plug-fitted, to the second housing part in an airtight manner. In particular, the first housing part and the second housing part are screwed to one another, or in the axial direction are interconnected in a force-fitting manner, for example magnetically. Additionally or alternatively, a materially integral and/or form-fitting connection between the two housing parts is also conceivable. Alternatively, it is also conceivable for the first housing part and the second housing part to be configured conjointly in an integral manner (so as to be composed of one piece). Also, the perforated plate can be integrally embodied conjointly with the second housing part or the punch foot housing. However, it is also conceivable for the perforated plate to be connected as a separate component, in particular in a force-fitting manner, or else in form-fitting and/or materially integral manner, to the second housing part. An integral configuration is conceivable in particular also for the control element, that is to say that the plate-shaped portion, the collar-shaped portion, and/or the shaft-shaped portion are conjointly embodied in an integral manner. Furthermore, it is also conceivable, in particular in the case of an integral embodiment of the punch foot housing conjointly with the perforated plate, for the punch foot housing to be produced together with the perforated plate and the control element disposed therein as a unit in one common operational step (individual production step), in particular by way of a 3D printing method.

The object derived above in the case of a device for labeling individual packs having an advancing installation for transporting a respective pack along a transportation path;

having a label dispensing installation for providing an in particular pre-printed label; and having a label application installation having a label punch which has a punch shaft and a punch foot connected thereto;

whereby the label punch is movable between a dispensing position in which a dispensed label is able to be suctioned by the punch foot, and an application position in which the suctioned label is able to be blown down onto the respective pack, according to a second teaching of the present invention is achieved in that the punch foot is configured as has been described above.

The label punch is in particular a blower punch which is repositionable in a linear manner and is repositionable in a linear manner parallel to the transportation path, in particular in one direction or two mutually orthogonal directions, wherein the label punch can furthermore be repositionable in a linear manner orthogonal to the transportation path. Moreover, the label punch in one design embodiment can be mounted so as to be rotatable about the axis that runs perpendicularly (in the vertical direction) to the transportation path. Alternatively, the label punch can also be embodied as a so-called blower pendulum punch which is pivotably mounted such that the punch foot can carry out a pendulum motion along the transportation path. Additionally, the blower pendulum punch is also repositionable in particular horizontally and vertically.

As has been mentioned, the punch has a punch shaft which is embodied in particular as a hollow shaft. The punch shaft is in particular releasably connected to the punch foot, preferably by way of a quick-release mechanism. Additionally or alternatively, the first housing part can also be releasably connected to the second housing part of the punch foot housing, for example also by way of a quick-release mechanism. A quick-release mechanism can be formed by a magnetic connection between the two connecting partners (first housing part/second housing part; punch shaft/punch foot), or by a screw connection, or by a connection by means of radially movable locking bolts, to mention a few examples. For example, the punch foot at the first end thereof has a connector piece that corresponds to the punch shaft, the punch shaft in particular being able to be introduced into said connector piece. Locking bolts which in the radial direction in relation to the central axis of the punch foot are impinged with a spring force and which in particular have a rounded or chamfered surface such that the punch shaft when introduced into the connector piece initially pushes the bolts in a radially outward manner, the bolts, in the terminal position of said punch shaft, subsequently engaging in communicating clearances in the punch shaft, can in this instance sit in said connector piece. The same principle can be applied for removing the punch shaft from the punch foot. Such a connection can also be provided between the first and the second housing part. When required, a punch foot, or the part thereof that comprises the nozzles, can be very rapidly replaced using simple means by way of such a quick-release mechanism.

Finally, the object derived and visualized above in the case of a method for labeling individual packs while using a punch foot such as has been defined above, and/or while using a device such as has been defined above according to a third teaching of the present invention is achieved in that

- a label is suctioned by the punch foot at the second housing end thereof, in that the punch foot at the first housing end thereof is impinged with negative pressure, whereby on account of the negative pressure a suction flow counter to the extent direction is generated in the punch foot, said suction flow moving the control element to the first terminal position thereof (automatically, that is to say without additional measures and in particular without any intervention of the user);
- the label in the suctioned state, while maintaining the negative pressure, is then transported by the punch foot; and
- the label by the punch foot at the second housing end thereof is then blown down (onto a pack) in that the punch foot at the first housing end thereof is impinged with positive pressure, whereby on account of the positive pressure a pressure flow in the extent direction is generated in the punch foot, said pressure flow moving the control element to the second terminal position thereof (automatically, that is to say without additional measures and in particular without any intervention of the user).

According to one design embodiment of the method according to the invention it is provided that the suction flow in the first terminal position enters the punch foot housing exclusively by way of the at least one primary nozzle. In particular, the suction flow runs from the primary nozzle or the primary nozzles further by way of the at least one first connection opening, then further by way of the at least one second connection opening, and in the further course makes its way into the pressure duct.

Additionally or alternatively, it can be provided that the pressure flow in the second terminal position exits the punch foot housing by way of the at least one primary nozzle as well as (simultaneously) by way of the at least one secondary nozzle. Before the pressure flow exits the primary nozzle or the primary nozzles and the secondary nozzle or secondary nozzles, said pressure flow in particular by the pressure duct is initially directed by way of the at least one second connection opening. Here, part of the pressure flow exits toward the outside by way of the at least one secondary nozzle. The remaining part of the pressure flow in this case is directed by way of the at least one connection opening to the at least one primary nozzle and there exits to the environment.

There are now a multiplicity of possibilities of designing and refining the punch foot according to the invention, the device according to the invention, and the method according to the invention. Reference in this context is made, on the one hand, to the patent claims dependent on the coordinate patent claims 1, 24, and 25, and on the other hand to the description of exemplary embodiments in conjunction with the drawing in which:

Figure 1:
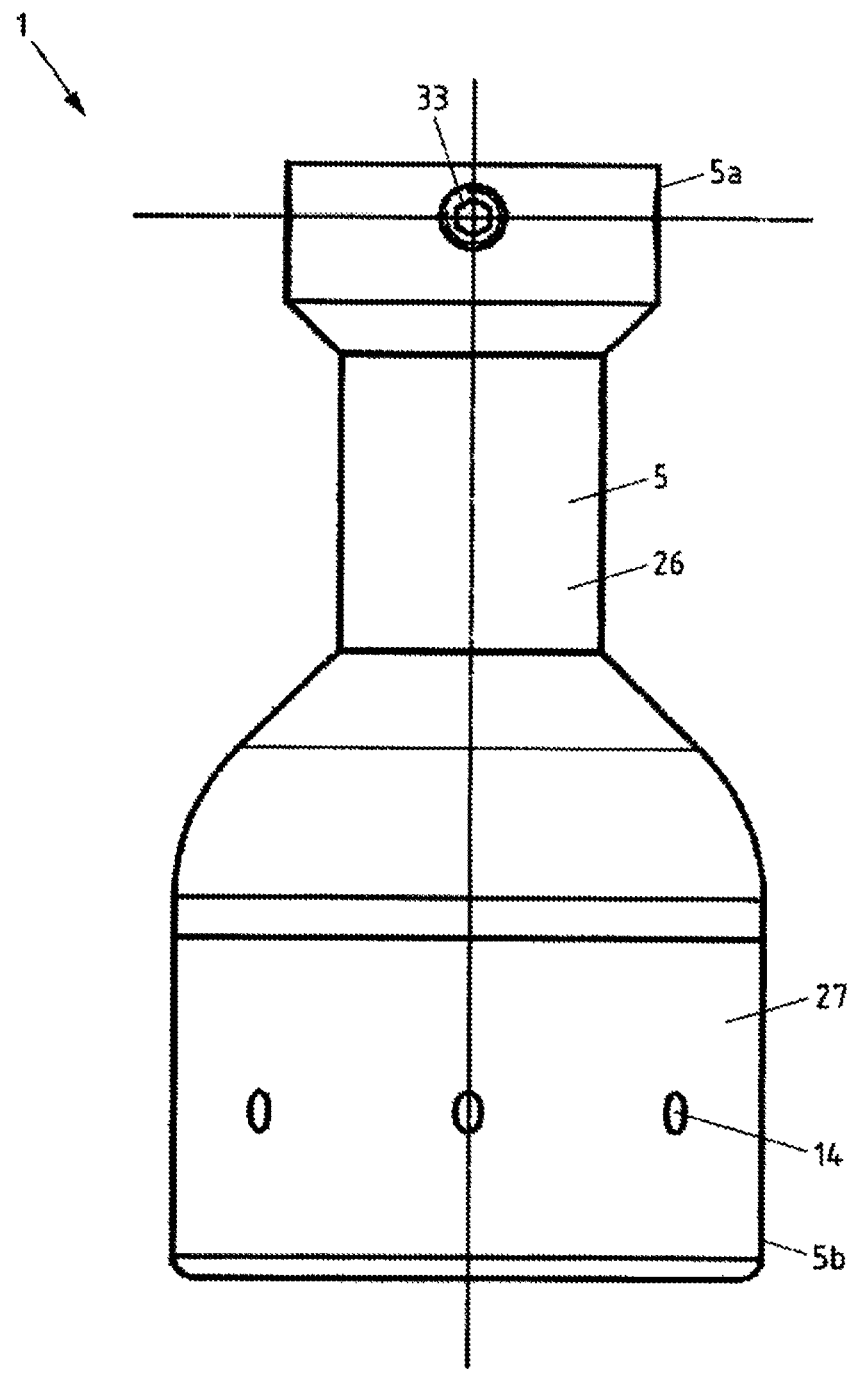
FIG. 1 shows a lateral view of a punch foot according to the invention.
Figure 2:
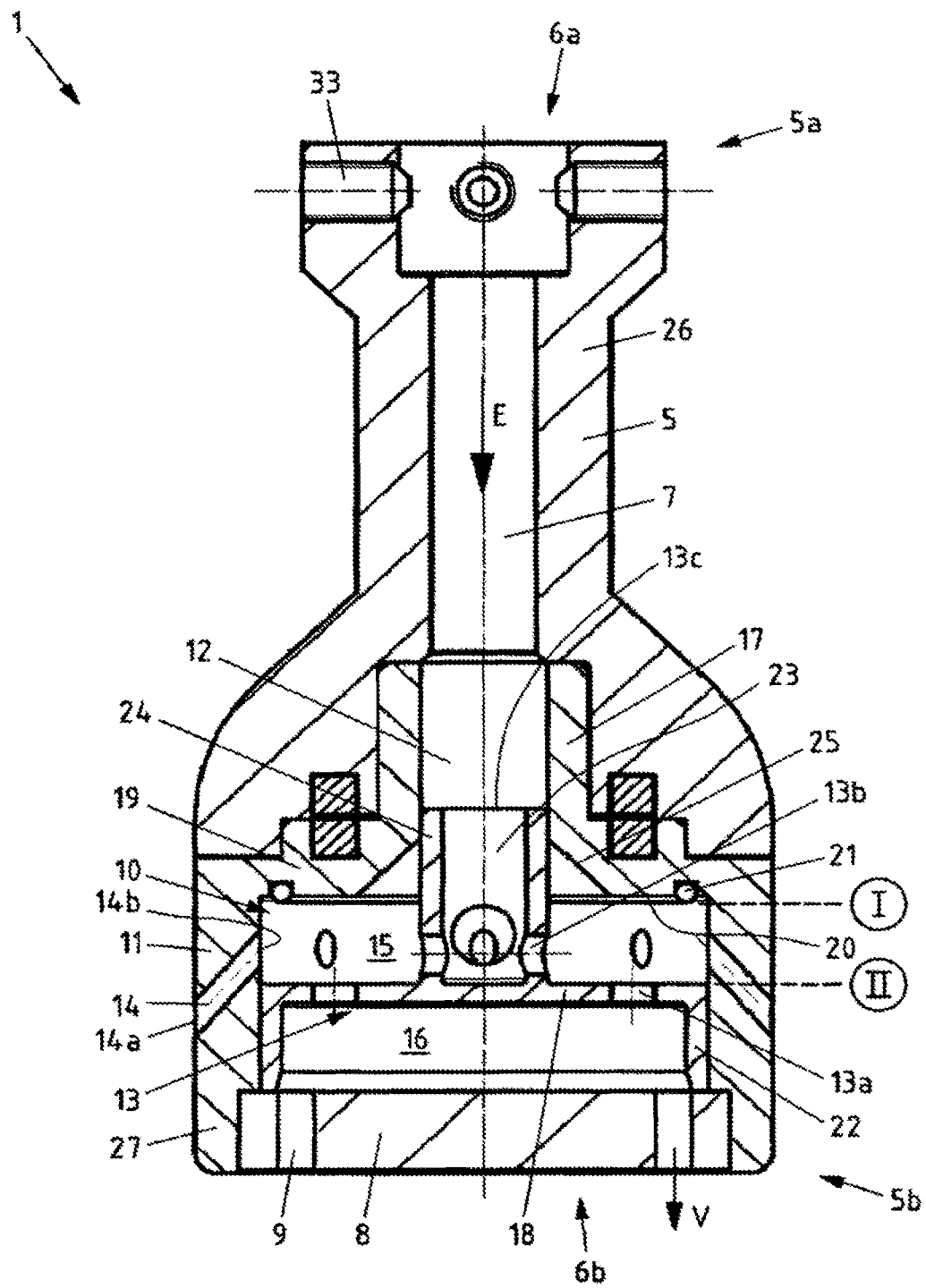
FIG. 2 shows a sectional view of the punch foot from FIG. 1.

A punch foot 1 in the form of a combined suction and blower head for a label punch 2 for use in a device 3 for labeling individual packs 4 is illustrated in FIGS. 1 and 2. The functioning of the punch foot 1 in conjunction with the label punch 2 within the device 3 is schematically illustrated in FIG. 3.

The punch foot 1 has a punch foot housing 5 which is configured so as to be symmetrical, in particular rotationally symmetrical, about a central axis that runs in the extent direction E. The punch foot housing 5 in said axial extent direction E extends from a first housing end 5a having a first housing opening 6a to a second housing end 5b having a second housing opening 6b. The punch foot housing 5 here in an exemplary manner is constructed in two parts and is composed of a first (upper) housing part 26 and of a second (lower) housing part 27, wherein the two housing parts 26 and 27 are fixedly interconnected, in particular in an airtight manner by way of force-fitting plug fitting, presently by a magnetic force. When required, the second housing part 27 that comprises the nozzles 9 and 14 is releasable from the first housing part 26 in a simple and rapid manner by way of such a quick-release mechanism in the form of a magnetic connection.

Figure 3:
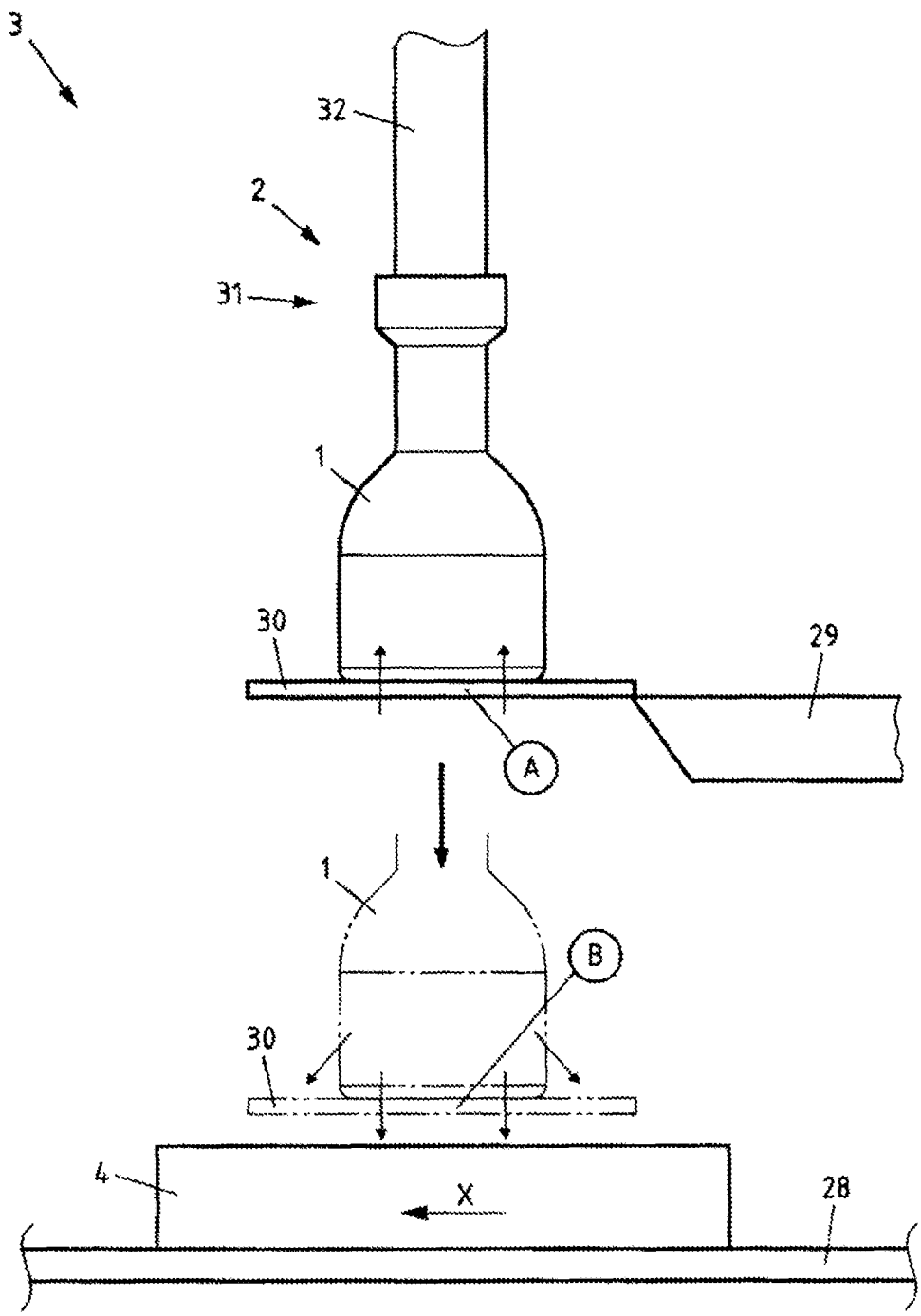
FIG. 3 shows a schematic view of a device for labeling individual packs while using the punch foot from FIGS. 1 and 2.

The punch foot 1 in the region of the upper housing end 5a has a further quick-release mechanism 33 in the form of a plurality of spring-force-loaded bolts which are disposed in a radial manner and rounded on the front side, on account of which the punch foot 1 can be plug-fitted to a punch shaft 32 in a simple way, as is shown in FIG. 3.

The interior of the punch foot 1 becomes evident in particular by means of FIG. 2. The punch foot housing 5 thus has a pressure duct 7 which from the first housing opening 6a extends in the extent direction E.

The second housing opening 6b is completely filled by a perforated plate 8 and is closed on account of the latter, wherein a plurality of primary nozzles 9 extend in an orientation direction V through the perforated plate 8.

Proceeding from the perforated plate 8, in particular from the internal side (upper side) thereof, a pressure chamber 10 which is laterally delimited by an encircling punch foot housing wall portion 11 extends counter to the extent direction E. Further to the top, that is to say counter to the extent direction E, the pressure chamber 10 is delimited by a wall portion 19 that runs so as to be orthogonal to the extent direction E and by a connection portion 12 which fluidically connects the pressure duct 7 to the pressure chamber 10.

A control element 13 is disposed so as to be axially movable in the interior of the pressure chamber 10. The control element 13, by impingement by a flow, can be reciprocated between a first terminal position I and a second terminal position II. Each terminal position effects another flow through the pressure chamber 10. When the interior of the punch foot 1 is impinged with negative pressure, the control element 13 is thus automatically moved to the first terminal position I, specifically solely by the impingement by flow, or the suction force, which acts on the control element 13. When the interior of the punch foot 1 is impinged with positive pressure, the control element 13, on account thereof, is automatically moved to the second terminal position II, specifically solely by the impingement by flow, or the compressive force, respectively, which acts on the control element 13.

The punch foot housing wall portion 11 which laterally surrounds the pressure chamber 10 has a plurality of secondary nozzles 14 which circumferentially are disposed at identical spacings and connect the pressure chamber 10 to the environment of the punch foot housing 5. If the control element 13 is in the first terminal position I, the secondary nozzles 14 on the internal side are covered by the control element 13 and, on account thereof, deactivated. There is no flow through the secondary nozzles 14 in this state. By contrast, if the control element 13 is in the second terminal position II, the secondary nozzles 14 are completely released and can be subjected to a flow through from the pressure chamber 10.

By contrast, the primary nozzles 9 that are disposed in the perforated plate 8 can be subjected to a flow through in each of the terminal positions I and II of the control element 13.

As is furthermore shown in FIG. 2, the secondary nozzles 14 are disposed in a portion of the punch foot housing 5 above the primary nozzles 9. Moreover, the secondary nozzles 14 lie so as to be radially further outward than the primary nozzles 9. Finally, the secondary nozzles 14 also have another orientation (other orientation direction) than the primary nozzles 9. The primary nozzles 9 thus specifically run parallel to the extent direction E, whereas the secondary nozzles 14 have an oblique orientation in such a manner that the external opening 14a of each secondary nozzle 14 is closer to the second housing end 5b than the respective internal opening 14b of the secondary nozzle 14. In the present exemplary embodiment the secondary nozzles 14 run at an angle in a range from 40 to 45° to the extent direction E.

All nozzles, both the primary nozzles 9 as well as the secondary nozzles 14, here in an exemplary manner are tubular ducts, in particular bores. Additionally or alternatively, individual or all of the nozzles 9 and 14, respectively, can also be formed by a tube that is extended toward the outside, and or be configured so as to be slot-shaped.

The pressure chamber 10 by the control element 13 is subdivided into a first (upper) pressure chamber portion 15 and a second (lower) pressure chamber portion 16, wherein the latter is adjacent to the perforated plate 8. The control element 13 here is composed of a plate-shaped portion 18, of a collar-shaped portion 22 that is disposed thereon on the lower side, and a shaft-shaped hollow portion 23 that is disposed thereon on the upper side. A plurality of first connection openings 13a which extend through the plate-shaped portion 18 from the first pressure chamber portion 15 to the second pressure chamber portion 16 run in the plate-shaped portion 18 so as to be distributed at uniform spacings across the circumference. The collar-shaped portion 22 extends in a portion that is radially outside the first connection openings 13a that are disposed in an annular manner. The shaft-shaped portion 23 extends radially within the first connection openings 13a that are disposed in an annular manner.

The collar-shaped portion 22 is free of further openings and serves for closing the secondary nozzles 14 on the internal side in the first terminal position I.

The shaft-shaped portion 23 has a plurality of radial second connection openings 13b which are circumferentially disposed at identical spacings, presently in an exemplary manner four second connection openings 13b, and at the upper end of said shaft-shaped portion 23 an opening 13c which is coaxial with the pressure duct 7. The shaft-shaped portion 23 is mounted so as to be movable in a further punch foot housing wall portion 17 that laterally delimits the connection portion 12. Accordingly, the control element 13 on the internal side in the punch foot housing 5 is supported by way of the shaft-shaped portion 23 and the collar-shaped portion 22.

The connection portion 12 furthermore has a portion 25 having a funnel-shaped cross-sectional widening, wherein the cross section of the portion 25 widens continuously in the extent direction. The portion 25 having the cross-sectional widening opens into the pressure chamber 10 and in particular into the first pressure chamber portion 15. The portion 25 at the lower end thereof, facing the perforated plate 8, transitions to the wall portion 19 which closes the pressure chamber 10 toward the top.

The wall portion 19 has a wall face 20 which points toward the perforated plate 8 and on which an encircling protrusion 21 here in the form of an annular seal 21, is provided. The annular seal 21 here serves as a spacer and guarantees that a narrow space or gap, respectively, remains between the upper side of the plate-shaped portion 18 and the wall face 20 of the wall portion 19 in the upper terminal position I of the control element 13.

In the case of the exemplary embodiment illustrated in FIGS. 1 and 2 it is furthermore provided in the exemplary manner that the total cross-sectional area of all primary nozzles 9, that is to say the sum of the individual cross-sectional areas of all primary nozzles 9, is greater than the total cross-sectional area, or the sum of the individual cross-sectional areas of all secondary nozzles 14, respectively. Also, the total cross-sectional area of all primary nozzles 9 is smaller than the total cross-sectional area of all first connection openings 13a, on the one hand, and of all second connection openings 13b, on the other hand. Finally, the total cross-sectional area of all first connection openings 13a is greater than the total cross-sectional area of all second connection openings 13b, the total cross-sectional area of the latter in turn being smaller than that of the opening 13c.

In the case of a negative pressure bearing on the first housing opening 6a, of the punch foot housing 5, the control element 13 on account of the suction force which acts on the control element 13, is automatically moved to the upper terminal position I. In this case, an airflow is initially guided by way of the primary nozzles 9 into the second pressure chamber portion 16, from there by way of the first connection openings 13a into the first pressure chamber portion 15 which is formed by a flat space portion, the height thereof being determined by the height of the protrusion 21, then from here into the portion 25 having the cross-sectional widening, then further by way of the second connection openings 13b into the shaft-shaped hollow portion 23, and from there into the pressure duct 7 and by way of the first housing opening 6a back out of the punch foot 1 again, in particular into a hollow punch shaft 32.

In the opposite case of a positive pressure bearing on the first housing opening 6a, the control element 13, on account of the compressive force acting thereon, is moved to the second terminal position II. A flow therethrough in this instance is performed from the first housing opening 6a by way of the pressure duct 7 and of an upper portion of the connection portion 17 into the shaft-shaped hollow portion 23, then from there by way of the second connection openings 13b into the first pressure chamber portion 15 which now is significantly enlarged as compared to the previous position. Here, the flow is divided into a first part-flow which from the first pressure chamber portion 15 by way of the secondary nozzles 14 exits in a first direction into the environment of the punch foot 1. The remaining part-flow (second part-flow) is guided out of the first pressure chamber portion 15 by way of the first connection openings 13*a* into the second pressure chamber portion 16 which is now reduced in size, and from there exits by way of the primary nozzles 9 in the other direction into the environment of the punch foot 1.

FIG. 3 finally shows a device 3 for labeling individual packs 4, having an advancing installation 28 for transporting a respective pack 4 along a transportation path X, having a label dispensing installation 29 for providing a printed label 30, and having a label application installation 31 having a label punch 2 which has a punch shaft 32 and a punch foot 1 connected thereto, wherein the label punch 2 is movable between a dispensing position A in which a dispensed label 30 is able to be suctioned by the punch foot 1, and an application position B in which the suctioned label 30 is able to be blown down onto the respective pack 4.

The respective label 30 in the dispensing position A here is suctioned by the punch foot 1 described above exclusively by way of the primary nozzles 9 (the control element 13 in this position is in the first terminal position I).

The label punch 2 is subsequently lowered in the direction of the pack 4 being guided past the latter, and is stopped short of the upper side of the pack 4. Here, a positive pressure is then directed by way of the punch shaft 32 into the punch foot 1, on account of which the control element 13 is moved to the second terminal position II. This has the consequence that a compressed air pulse exits from the punch foot 1 out of the primary nozzles 9 as well as simultaneously out of the secondary nozzles 14, said punch foot 1 transferring the label 30 onto the pack 4.

The invention claimed is:

1. A punch foot for a label punch, said punch foot comprising:
   a punch foot housing that extends in an extension direction from a first housing end having a first housing opening to a second housing end having a second housing opening;
   a pressure duct that extends within the punch foot housing from the first housing opening in the extension direction;
   a perforated plate that is received within the second housing opening and is connected to the punch foot housing, wherein said perforated plate defines one or more primary nozzle(s) for discharging a compressed gas in an orientation direction;
   a pressure chamber defined within the punch foot housing, said pressure chamber extending from the perforated plate counter to the extension direction and being delimited on all sides orthogonal to the extension direction by a punch foot housing wall portion;
   a connection portion defined within the punch foot housing that extends between and connects the pressure duct and the pressure chamber; and
   a control element disposed in the pressure chamber such that the control element is laterally surrounded by the punch foot housing wall portion, said control element being reciprocally movable between a first terminal position and a second terminal position, said control element being configured to move to the first terminal position in response to negative pressure in the pressure duct, and said control element being configured to move to the second terminal position in response to positive pressure in the pressure duct;
   wherein the one or more primary nozzle(s) connect(s) the pressure chamber to an external environment of the punch foot housing, and
   wherein one or more secondary nozzle(s), which connect(s) the pressure chamber to the external environment of the punch foot housing, extend(s) through the punch foot housing wall portion such that when a label that is larger than a cross-section of the punch foot at the second housing end is being blown down by compressed gas exiting the pressure chamber said label is impacted by compressed gas exiting the one or more secondary nozzle(s) of the punch foot.

2. The punch foot as claimed in claim 1, wherein the perforated plate defines a plurality of primary nozzles and/or the punch foot housing wall portion defines a plurality of secondary nozzles.

3. The punch foot as claimed in claim 1, wherein the one or more primary nozzle(s) and/or the one or more secondary nozzle(s) is/are configured as (a) tubular duct(s).

4. The punch foot as claimed in claim 1, wherein the one or more primary nozzle(s) is/are spaced apart in the extension direction from the one or more secondary nozzle(s).

5. The punch foot as claimed in claim 1, wherein the one or more secondary nozzle(s) at least in portions run(s) so as to be angled with respect to the extension direction.

6. The punch foot as claimed in claim 5, wherein one or more secondary nozzle(s) is/are angled toward the second housing end of the punch foot housing.

7. The punch foot as claimed in claim 1, wherein the control element subdivides the pressure chamber in the extension direction into a first pressure chamber portion and a second pressure chamber portion, and wherein the first pressure chamber portion lies between the control element and the connection portion, and wherein the second pressure chamber portion lies between the control element and the perforated plate.

8. The punch foot as claimed in claim 7, wherein the first pressure chamber portion is connected to the second pressure chamber portion by one or more first connection opening(s) in the control element or between the control element and the punch foot housing wall portion.

9. The punch foot as claimed in claim 8, wherein the first pressure chamber portion is connected to the connection portion by one or more second connection opening(s) in the control element or between the control element and a further punch foot housing wall portion that delimits the connection portion on all sides orthogonal to the extension direction.

10. The punch foot as claimed in claim 7, wherein the first pressure chamber portion is connected to the external environment of the punch foot housing by the one or more secondary nozzle(s).

11. The punch foot as claimed in claim 1, wherein the control element and the pressure chamber are configured such that:
   the control element, when in the first terminal position, completely blocks the one or more secondary nozzle(s); and
   the control element, when in the second terminal position, does not completely block the one or more secondary nozzle(s).

12. The punch foot as claimed in claim 9, wherein the control element has a plate-shaped portion that extends within the pressure chamber orthogonal to the extension direction between the first pressure chamber portion and the second pressure chamber portion.

13. The punch foot as claimed in claim 12, wherein the one or more second connection opening(s) is/are disposed in the plate-shaped portion, or between the plate-shaped portion and the punch foot housing wall portion.

14. The punch foot as claimed in claim 13, wherein the pressure chamber has a wall portion, orthogonal to the extension direction, having a wall face that points toward the perforated plate.

15. The punch foot as claimed in claim 12, wherein the control element has a collar-shaped portion that is connected to the plate-shaped portion.

16. The punch foot as claimed in claim 15, wherein the plate-shaped portion and/or the collar-shaped portion bear/bears on an internal side the punch foot housing wall portion.

17. The punch foot as claimed in claim 12, wherein the control element has a shaft-shaped hollow portion that is connected to the plate-shaped portion.

18. The punch foot as claimed in claim 17, wherein the shaft-shaped portion has a shaft wall that is orthogonal to the plate-shaped portion and at an end thereof at a pressure duct side delimits an opening that is coaxial with the pressure duct, and wherein the one or more second connection opening(s) is/are disposed in the shaft wall.

19. The punch foot as claimed in claim 17, wherein the shaft-shaped portion bears on an internal side of the connection portion and therein is movably guided, and wherein the one or more second connection opening(s) is/are not completely blocked by the control element when the control element is in the first terminal position and/or the second terminal position.

20. The punch foot as claimed in claim 9, wherein a total cross-sectional area of all the one or more primary nozzle(s):
is at least equal to or greater than a total cross-sectional area of all the one or more secondary nozzle(s), and/or
is at most equal to or smaller than a total cross-sectional area of all the one or more first connection opening(s) and/or the one or more second connection opening(s).

21. The punch foot as claimed in claim 18, wherein the total cross-sectional area of all the one or more second connection opening(s):
is at most equal to or smaller than a total cross-sectional area of all the one or more first connection opening(s), and/or
is at most equal to or smaller than a cross-sectional area of a coaxial opening of the shaft-shaped portion.

22. The punch foot as claimed in claim 9, wherein an end of the connection portion that faces the perforated plate has a portion having a cross-sectional widening, and wherein the one or more second connection opening(s) in the first terminal position of the control element open(s) into the portion having the cross-sectional widening.

23. The punch foot as claimed in claim 1, wherein the punch foot housing is constructed in two parts, wherein a first of the two parts comprises the pressure duct, and wherein a second of the two parts comprises the connection portion, the pressure chamber, and the perforated plate, and wherein the first of the two parts is connected to the second of the two parts in an airtight manner.

24. A device for labeling individual packages, comprising:
an advancing installation for transporting a respective package along a transportation path;
a label dispensing installation for providing a label; and
a label application installation having a label punch which has a punch shaft and a punch foot connected thereto;
wherein the label punch is movable between a dispensing position in which a dispensed label is suctioned by the punch foot, and an application position in which the suctioned label is blown down onto the respective package, and
wherein the punch foot is configured as claimed in claim 1.

25. A method for labeling individual packages, the method comprising:
providing a punch foot as claimed in claim 1;
suctioning a label into a suctioned state by the punch foot at the second housing end by impinging a negative pressure at the first housing end, wherein on account of the negative pressure a suction flow counter to the extension direction is generated in the punch foot, said suction flow moving the control element to the first terminal position;
transporting the label using the punch foot in the suctioned state, while maintaining the negative pressure; and
blowing the label down by the punch foot at the second housing end by impinging the first housing end with positive pressure, wherein on account of the positive pressure a pressure flow in the extension direction is generated in the punch foot, said pressure flow moving the control element to the second terminal position.

26. The method as claimed in claim 25, wherein the suction flow in the first terminal position enters the punch foot housing exclusively by way of the one or more primary nozzle(s).

27. The method as claimed in claim 25, wherein the pressure flow in the second terminal position exits the punch foot housing through the one or more primary nozzle(s) and through the one or more secondary nozzle(s).

* * * * *